US011163608B2

(12) United States Patent
Phuke et al.

(10) Patent No.: US 11,163,608 B2
(45) Date of Patent: Nov. 2, 2021

(54) METHOD AND SYSTEM FOR PRIVACY ENABLED TASK ALLOCATION

(71) Applicant: Tata Consultancy Services Limited, Mumbai (IN)

(72) Inventors: Nitin Ganesh Phuke, Pune (IN); Mangesh Sharad Gharote, Pune (IN); Saket Kumar Saurabh, Pune (IN); Sachin Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 100 days.

(21) Appl. No.: 16/817,208

(22) Filed: Mar. 12, 2020

(65) Prior Publication Data
US 2020/0293374 A1 Sep. 17, 2020

(30) Foreign Application Priority Data
Mar. 13, 2019 (IN) .............................. 201921009813

(51) Int. Cl.
*G06F 9/50* (2006.01)
*G06F 21/62* (2013.01)

(52) U.S. Cl.
CPC ........ *G06F 9/5011* (2013.01); *G06F 21/6218* (2013.01)

(58) Field of Classification Search
CPC ............... G06F 21/6218; G06F 9/5011; G06Q 10/06311; G06Q 10/063112; G06Q 10/0635; G06Q 10/06398
See application file for complete search history.

(56) References Cited

U.S. PATENT DOCUMENTS

| 7,069,229 B1 * | 6/2006 | Richardson .... G06Q 10/063114 705/7.15 |
| 8,335,704 B2 * | 12/2012 | Trefler ........... G06Q 10/063112 705/7.14 |

(Continued)

FOREIGN PATENT DOCUMENTS

IN  3723/MUM/2013  11/2013

OTHER PUBLICATIONS

Odzaly. E.E. et al. (2017). "Agile risk management using software agents," *Journal of Ambient Intelligence and Humanized Computing*, pp. 823-841.

*Primary Examiner* — Jorge A Chu Joy-Davila
(74) *Attorney, Agent, or Firm* — Finnegan, Henderson, Farabow, Garrett & Dunner, LLP

(57) ABSTRACT

Data is an asset to any organization and any breach to the data during task allocation to agents may lead to serious damage to organizations including loss of consumer confidence, trust, reputation, financial penalties and the like. Conventional methods mainly focus on the allocating task to agents based on user satisfaction, overall throughput and maximize revenue and less focus is given to data privacy. The present subject matter overcomes the limitations of the conventional methods for task allocation by utilizing a dynamic data exposure analysis method, which enables seamless upgrading of the data access policy and or control. Here, a data exposure is monitored based on a data exposure score, dynamic identification of conflicting tasks and a dynamic privacy budget. The data exposure score is calculated in two execution points. Finally all the values are updated in the system for utilization in the further privacy enabled task allocation.

20 Claims, 10 Drawing Sheets

(56) References Cited

U.S. PATENT DOCUMENTS

| | | | |
|---|---|---|---|
| 10,049,332 B2* | 8/2018 | Jones | G06Q 10/06311 |
| 2005/0091098 A1* | 4/2005 | Brodersen | G06Q 10/06 |
| | | | 705/500 |
| 2009/0204471 A1 | 8/2009 | Elenbaas et al. | |
| 2009/0281879 A1* | 11/2009 | Pandya | G06Q 10/063112 |
| | | | 705/7.14 |
| 2011/0231317 A1 | 9/2011 | Arsac | |
| 2012/0215578 A1* | 8/2012 | Swierz, III | G06Q 50/205 |
| | | | 705/7.14 |
| 2016/0078348 A1* | 3/2016 | Finch | G06N 5/04 |
| | | | 706/12 |
| 2018/0307854 A1 | 10/2018 | Bernau et al. | |

\* cited by examiner

METHOD AND SYSTEM FOR PRIVACY ENABLED TASK ALLOCATION

PRIORITY CLAIM

This U.S. patent application claims priority under 35 U.S.C. § 119 to: India Application No. 201921009813, filed on Mar. 13, 2019. The entire contents of the aforementioned application are incorporated herein by reference.

TECHNICAL FIELD

The disclosure herein generally relates to data security, and, more particularly, to a method and system for privacy enabled task allocation.

BACKGROUND

Data is an asset to any organization and any breach to the data may lead to serious damage to organizations including loss of user confidence, trust, reputation, financial penalties and the like. Data breach is common in service based organizations including IT maintenance and support, health care, telecommunications, infrastructural, or related to deployed software. The service based organizations provides service to users by utilizing an agent and the agent can be a computer module or a human being. The agent can access database to provide service to the users and there is a possibility for data breach through the agent. Hence there is a need to monitor data exposure through agents while allocating and executing service oriented tasks through the agent.

Conventional methods mainly focus on the allocating task to agents based on user satisfaction, overall throughput and maximize revenue and hardly focus on data privacy. Further, the conventional methods handle access control of database, to the agents, based on static roles, which require upgrading. However, the upgrading is not performed very often. Thus, existing methods based on static roles causes the agent to perform same category of task repeatedly. The repeated execution of similar task by the same agent enables ease in anticipation of future actions leading to higher chances of data privacy breach through the agent.

SUMMARY

Embodiments of the present disclosure present technological improvements as solutions to one or more of the above-mentioned technical problems recognized by the inventors in conventional systems. For example, in one embodiment, a method for privacy enabled task allocation is provided. The method includes receiving a plurality of tasks. Here, each of the plurality of tasks comprises a set of task attributes. Further, the method dynamically classifies the plurality of tasks by comparing the set of task attributes with a predefined task categories to obtain a set of categorized tasks. Further, the method identifies, for each task, a set of competent agents from a plurality of agents based on a category and a competency associated with each of the plurality of agents. Further, the method calculates, a first data exposure score associated with each of the set of competent agents corresponding to each categorized task based on a first trust value of each competent agent and a first risk value of each categorized task, wherein the first trust value of each competent agent is calculated based on a plurality of trust attributes and the first risk value of each categorized task is calculated based on a plurality of risk attributes. Further, the method simultaneously identifies a conflict value associated with the set of categorized tasks and the set of competent agents based on a predefined task conflict matrix, wherein the predefined task conflict matrix comprises one or more combinations of the categorized tasks, and a privacy breach associated with each competent agent while executing each combination of the categorized task. Furthermore, the method allocates, each categorized task with a competent agent from the set of competent agents based on a plurality of allocation parameters, wherein the plurality of allocation parameters comprising an operational cost associated with each competent agent, a predetermined privacy budget associated with each competent agent, the first data exposure score associated with the competent agent and the conflict value.

In another aspect, a system for privacy enabled task allocation is provided. The system includes at least one memory comprising programmed instructions, at least one hardware processor operatively coupled to the at least one memory, wherein the at least one hardware processor are capable of executing the programmed instructions stored in the at least one memories; and a dynamic data analysis unit, wherein the dynamic data analysis unit is configured to receive, a plurality of tasks, wherein each of the plurality of tasks comprises a set of task attributes. Further, the dynamic data analysis unit is configured to dynamically classify, the plurality of tasks by comparing the set of task attributes with a predefined task categories to obtain a set of categorized tasks. Further, the dynamic data analysis unit is configured to identify for each task, a set of competent agents from a plurality of agents based on a category and a competency associated with each of the plurality of agents. Further, the dynamic data analysis unit is configured to calculate a first data exposure score associated with each of the set of competent agents corresponding to each categorized task based on a first trust value of each competent agent and a first risk value of each categorized task, wherein the first trust value of each competent agent is calculated based on a plurality of trust attributes and the first risk value of each categorized task is calculated based on a plurality of risk attributes. Further, the dynamic data analysis unit is configured to simultaneously identify a conflict value associated with the set of categorized tasks and the set of competent agents based on a predefined task conflict matrix, wherein the predefined task conflict matrix comprises one or more combinations of the categorized tasks, and a privacy breach associated with each competent agent while executing each combination of the categorized task. Furthermore, the dynamic data analysis unit is configured to allocate each categorized task with a competent agent from the set of competent agents based on a plurality of allocation parameters, wherein the plurality of allocation parameters comprising an operational cost associated with each competent agent, a predetermined privacy budget associated with each competent agent, the first data exposure score associated with the competent agent and the conflict value.

In yet another aspect, a computer program product comprising a non-transitory computer-readable medium having embodied therein a computer program for method and system for privacy enabled task allocation is provided. The computer readable program, when executed on a computing device, causes the computing device to receive, a plurality of tasks, wherein each of the plurality of tasks comprises a set of task attributes. Further, the computer readable program, when executed on a computing device, causes the computing device to dynamically classify, the plurality of tasks by comparing the set of task attributes with a predefined task categories to obtain a set of categorized tasks. Further, the computer readable program, when executed on a computing device, causes the computing device to identify, for each task, a set of competent agents from a plurality of agents based on a category and a competency associated with each of the plurality of agents. Further, the computer readable program, when executed on a computing device, causes the computing device to calculate a first data exposure score associated with each of the set of competent agents corresponding to each categorized task based on a first trust value of each competent agent and a first risk value of each categorized task, wherein the first trust value of each competent agent is calculated based on a plurality of trust attributes and the first risk value of each categorized task is calculated based on a plurality of risk attributes. Further, the computer readable program, when executed on a computing device, causes the computing device to simultaneously identify a conflict value associated with the set of categorized tasks and the set of competent agents based on a predefined task conflict matrix, wherein the predefined task conflict matrix comprises one or more combinations of the categorized tasks, and a privacy breach associated with each competent agent while executing each combination of the categorized task. Further, the computer readable program, when executed on a computing device, causes the computing device to allocate each categorized task with a competent agent from the set of competent agents based on a plurality of allocation parameters, wherein the plurality of allocation parameters comprising an operational cost associated with each competent agent, a predetermined privacy budget associated with each competent agent, the first data exposure score associated with the competent agent and the conflict value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
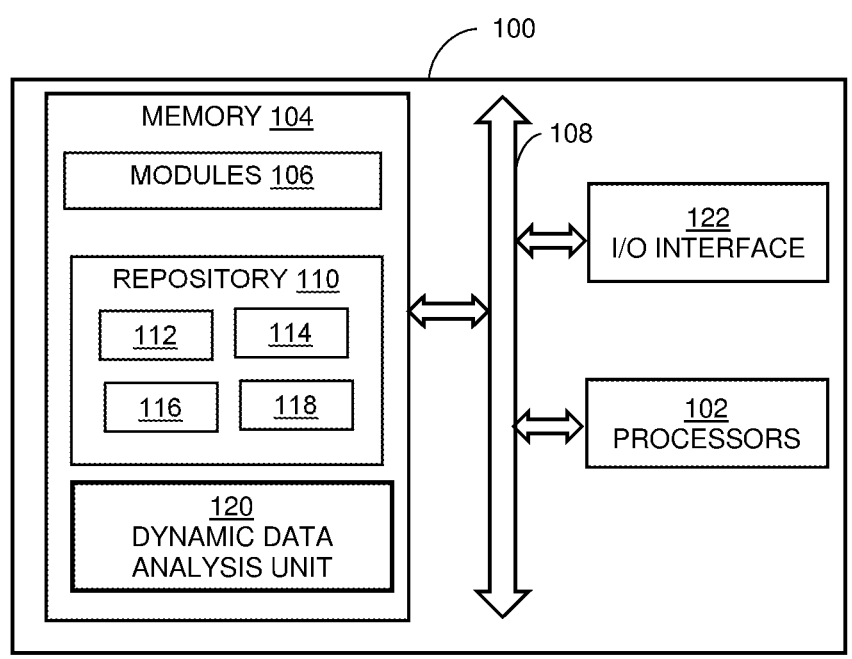
FIG. 1 illustrates a system 100 for privacy enabled task allocation, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments herein provide a method and system for privacy enabled task allocation. Unlike the existing methods that allocate task to agents for accessing the database based on user satisfaction, overall throughput and maximize revenue with static roles defined for data access, the method and system disclosed performs task allocation by utilizing a dynamic data exposure analysis method, which enables seamless upgrading of the data access policy and or control. Here, a data exposure is monitored based on a dynamic data exposure score, identification of conflicting tasks and a privacy budget. An implementation of the method and system for privacy enabled task allocation is described further in detail with reference to FIGS. 1 through 8E.

Referring now to the drawings, and more particularly to FIG. 1 through 8E, where similar reference characters denote corresponding features consistently throughout the figures, there are shown preferred embodiments and these embodiments are described in the context of the following exemplary system and/or method.

FIG. 1 illustrates a system for privacy enabled task allocation, according to some embodiments of the present disclosure. The system 100 for privacy enabled task allocation, includes or is otherwise in communication with one or more hardware processors 102, at least one memory such as a memory 104, an I/O interface 122 and a dynamic data analysis unit 120. In an embodiment, the dynamic data analysis unit 120 including an administrative module (not shown in FIG. 1), a risk assessment module (not shown in FIG. 1), a task allocation module (not shown in FIG. 1), adaptation module (not shown in FIG. 1), privacy enabled matching module (not shown in FIG. 1), adaption module (not shown in FIG. 1), task execution module and a reporting and monitoring module (not shown in FIG. 1). The one or more processors 102, memory 104, and the I/O interface 122 may be coupled by a system bus such as a system bus 108 or a similar mechanism.

The I/O interface 122 may include a variety of software and hardware interfaces, for example, a web interface, a graphical user interface, and the like. The interfaces 122 may include a variety of software and hardware interfaces, for example, interfaces for peripheral device(s), such as a keyboard, a mouse, an external memory, a camera device, and a printer. Further, the interfaces 122 may enable the system 100 to communicate with other devices, such as web servers and external databases. The interfaces 122 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 122 may include one or more ports for connecting a number of computing systems with one another or to another server computer. The I/O interface 122 may include one or more ports for connecting a number of devices to one another or to another server.

The one or more hardware processors 102 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and a repository 110 for storing data processed, received, and generated by one or more of the modules 106 and the dynamic data analysis unit 120. The modules 106 may include routines, programs, objects, components, data structures, and so on, which perform particular tasks or implement particular abstract data types.

The memory 104 also includes module(s) 106 and a data repository 110. The module(s) 106 include programs or coded instructions that supplement applications or functions performed by the system 100 for privacy enabled task allocation. The modules 106, amongst other things, can include routines, programs, objects, components, and data structures, which perform particular tasks or implement particular abstract data types. The modules 106 may also be used as, signal processor(s), state machine(s), logic circuitries, and/or any other device or component that manipulates signals based on operational instructions. Further, the modules 106 can be used by hardware, by computer-readable instructions executed by a processing unit, or by a combination thereof. The modules 106 can include various sub-modules (not shown). The modules 106 may include computer-readable instructions that supplement applications or functions performed by the system 100 for privacy enabled task allocation.

The data repository 110 may include received set of tasks 112, a reference database 114, an agent database 116 and other data 118. Further, the other data 118 amongst other things, may serve as a repository for storing data that is processed, received, or generated as a result of the execution of one or more modules in the module(s) 106 and the modules associated with the dynamic data analysis unit 120.

Although the data repository 110 is shown internal to the system 100, it will be noted that, in alternate embodiments, the data repository 110 can also be implemented external to the system 100, where the data repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS). In another embodiment, the data stored in the data repository 110 may be distributed between the 100 and the external database.

Figure 2:
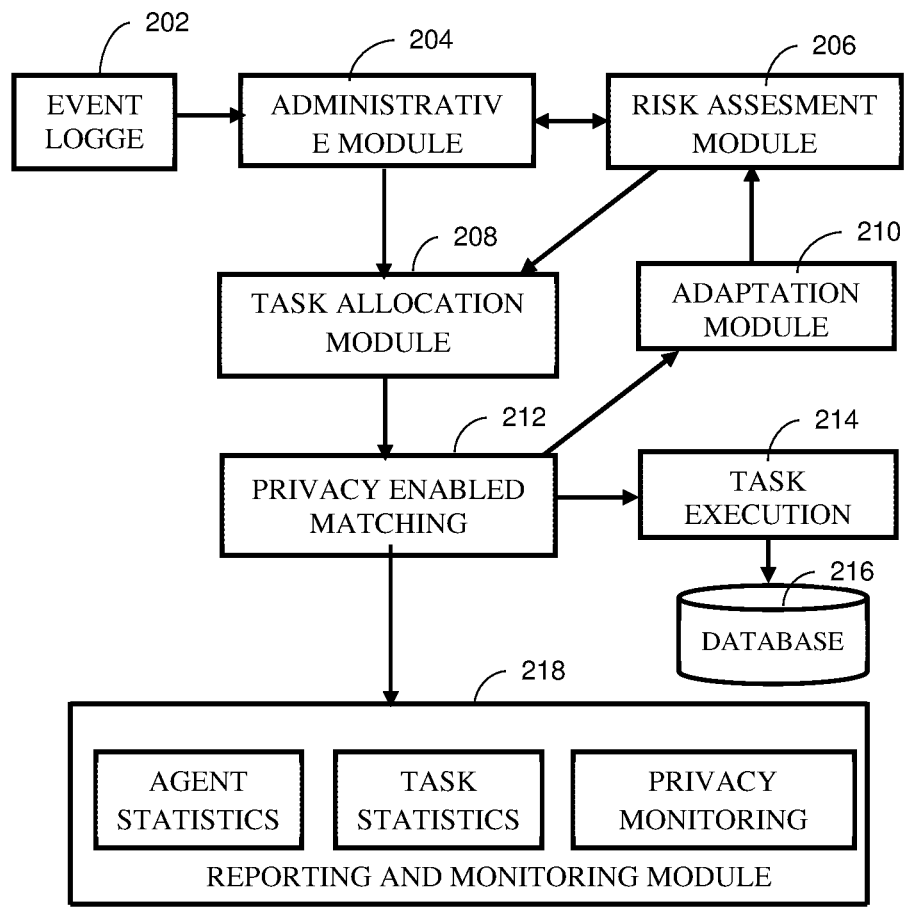
FIG. 2 illustrates an exemplary architecture of a dynamic data analysis unit of the system for privacy enabled task allocation, according to some embodiments of the present disclosure.

FIG. 2 illustrates an exemplary architecture of the dynamic data analysis unit 120 of the system 100 for privacy enabled task allocation, according to some embodiments of the present disclosure. The system includes an event logger 202, an administrative module 204, a risk assessment module 206, a task allocation module 208, an adaptation module 210, privacy enabled matching module 212, a task execution module 214, a database 216, and a reporting and monitoring module 218. The event logger 202 receives a plurality of tasks or events from a user. In an embodiment, the event logger 202 is an interface to the user to create a request, to update a request, to modify a request, to track a request and to provide feedback. The administrative module 204 performs system configuration, task queuing, scheduling and co-ordinates other modules in the system 100. The risk assessment module 206 performs a risk assessment (explained further with reference to FIG. 3) by utilizing further modules including a competency calculation module, a data exposure score calculation module, a trust value calculation module, a privacy budget calculation module, a task conflict identification module and an agent threshold verification module. Further, the risk assessment is updated based on an adaptation function associated with adaptation module 210. The task allocation module 208 allocates tasks to plurality of agents based on a plurality of allocation constraints. The adaptation module 210 updates all the calculated values associated with a previous task allocation. The privacy enabled matching module 212 matches a set of agents to each of a plurality of tasks based on a set of privacy constraints and an objective function. The task execution module 214 calculates a second data exposure score to identify a budget utilization associated with the agent and updates the privacy budget for further task allocation. The task execution module further includes an alert system to alert an administrator regarding an anomalous agent. The database 216 stores a plurality of user information, and a reporting and monitoring module 218 monitors each competent agent from a set of competent agents and create alert for any privacy breaches by the set of competent agents.

In an embodiment, the reporting and monitoring module 218 provides a plurality of statistics including a task statistics, an agent statistics and an operational statistics. The task statistics module reports the occurrence of each task and a Service Level Agreements (SLA) required to resolve that task. Further, a status report is generated for each task with log activity. The agent statistics provides a role associated with the agent, a skill set associated with the agent, an accuracy associated with the agent, a speed of operation associated with the agent and the details of privacy budget utilization by the agent. The operational statistics provides logs of the task allocation, queuing, cost optimization, user feedback and efficiency of the agent in previous allocations. Further, privacy breach is monitored periodically in different levels of data processing and identified with a change in color. In an embodiment, Green color alert indicates lowest level of privacy breach and a warning is given to the agent. Yellow color alert indicates a high level of breach and strict action is taken against the agent. Red color alert indicates to block the agent and no task is allocated further to the blocked agent.

Figure 3:
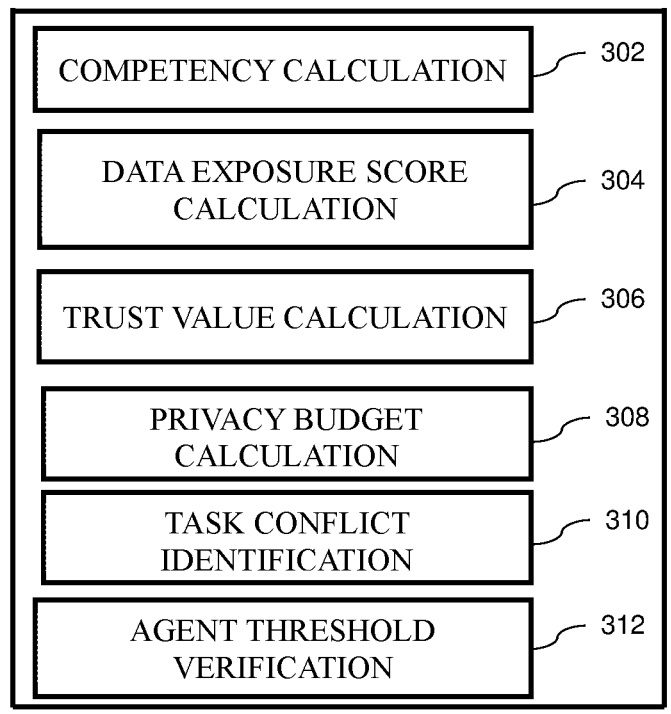
FIG. 3 illustrates an exemplary architecture of a risk assessment module of FIG. 2, according to some embodiments of the present disclosure.

FIG. 3 illustrates an exemplary architecture of the risk assessment module 206 of FIG. 2, according to some embodiments of the present disclosure. Now referring to the FIG. 3, the risk assessment module includes the competency calculation module 302, the data exposure score calculation module 304, the trust value calculation module 306, the privacy budget calculation module 308, the task conflict identification module 310 and the agent threshold verification module 312.

In an embodiment, an agent can unintentionally access a sensitive information associated with a task. To restrict access to the sensitive information, a privacy budget is allocated to each agent initially by the administrator. The privacy budget is allocated to the agent based on the role of the agent and the competency associated with the agent. The privacy budget is updated by the adaptation module (further explained with reference to FIG. 6) after each allocation.

Figure 4:
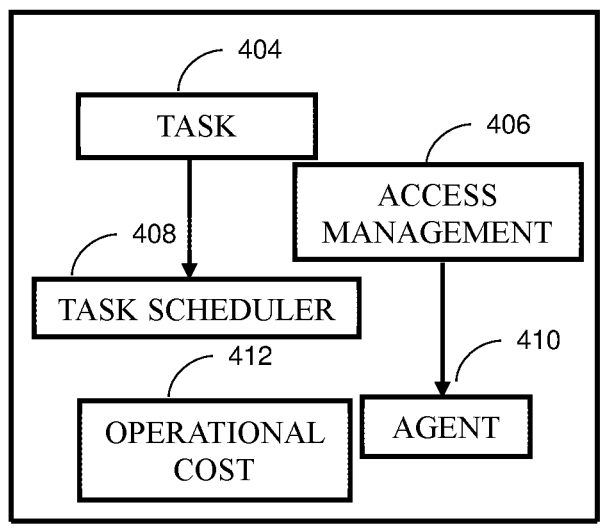
FIG. 4 illustrates an exemplary architecture of an administrative module of FIG. 2, according to some embodiments of the present disclosure.

FIG. 4 illustrates an exemplary architecture of the administrative module 204 of FIG. 2, according to some embodiments of the present disclosure. The administrative module is an intermediate module between a plurality of modules including the even logger module, the risk assessment module, the task allocation module, the adaptation module, the privacy enabled matching module, the task execution module and the reporting and monitoring module, to transmit and/or receive input/output to/from the plurality of modules. Further, the administrative module includes an access management module, a module to calculate efficiency of each of the plurality of agents based on accuracy, speed and skill set of the agent. Further, the administrative module includes a configuration setup for the overall privacy enabled task allocation. In an embodiment, the administrator configures a plurality of settings including privacy policies configurations, configuration of a role associated with each agent from the set of agents, task queuing/scheduling, configuring allocation algorithm and alerts configuration. All the configurations are performed in the configuration module.

Now referring to FIG. 4, the administrative module includes a task queue 404, an access management module 406, a task scheduler 408, a plurality of agents 410, and an operational cost calculation module 412. The task queue 404 temporarily store a plurality of tasks and the queue is emptied after allocation of the plurality of tasks to a corresponding set of competent agents. The access management module 406 authorizes the user while logging the event. The task scheduler 408 schedules each task to the competent agent from the plurality of agents 410 based on the plurality of allocation parameters including an operational cost associated with each competent agent, the predetermined privacy budget associated with each competent agent, the first data exposure score associated with the competent agent and the conflict value. Further, the task scheduler 408 includes a plurality of task scheduling strategies for allocating the plurality of tasks in batches. The operational cost calculation module 412 calculates the operational cost associated with each competent agent from the set of competent agents based on a cost associated with each competent agent, a complexity associated with each categorized task and a risk value associated with each categorized task. Further, the administrative module controls and coordinated all modules illustrated in FIG. 2. In an embodiment, the plurality of agents includes a human agent or a computer module or a combination of the human agent and the computer module.

The dynamic data analysis unit 150 of the system 100 can be configured to receive a plurality of tasks, wherein each of the plurality of tasks including a set of task attributes, wherein each task attribute from the set of task attributes being at least one of a plurality of attribute categories including a unique identifier (UI), a quasi-identifier (01) and a sensitive identifier (SI). The UI uniquely identifies an individual. For example, the UI includes full name, passport number. The 01 identifies an individual by combining one or more key attributes. For example, the 01 includes a combination of age, job function and postal code. The SI identifies sensitive information about an individual. For example, the SI includes diseases, income, transaction time, transaction id. Further, each attribute from the set of task attributes is associated with a weight based on the plurality of attribute categories. For example, the SI is associated with more weight compared to the UI and the QI.

Further, the dynamic data analysis unit 150 of the system 100 can be configured to dynamically classify the plurality of tasks by comparing the set of task attributes with a predefined task categories to obtain a set of categorized tasks. Here, the plurality of task categories includes an access request, an action request, a select request, a parameter request, an aggregate request associated with the database.

Further, dynamic data analysis unit 150 of the system 100 can be configured to identify, for each task, a set of competent agents from a plurality of agents based on a category and a competency associated with each of the plurality of agents. Here, a task category associated with each task is matched with an agent category associated with the plurality of agents to select a set of agents from the plurality of agents for executing each task from the set of categorized tasks. In an embodiment, the set of agents includes all agents from the plurality of agents. Further, a predetermined competency value of each agent from the set of agents corresponding to each categorized task is compared with a predetermined competency threshold corresponding to each task, to identify the set of competent agents for each categorized task.

In an embodiment, the competency associated with each agent from the set of agents includes a first level of expertise (E1), a second level of expertise (E2) and a third level of expertise (E3). Each agent is associated with a specific competency for each task. In an embodiment, the first level of expertise is an expert level (E3), the second level of expertise is an intermediate level (E2) and the third level of expertise is a beginner level (E1). For example, E3=90, E2=60, E1=30 for an agent for executing the task T1 and the agent is with E3 level of competency for the task T1. Further, the agent with E3 level of competency for the task T1 is with higher trust to perform the task T1. In an embodiment, the trust value associated with each agent increases with the periodical allocation of same category of task to same agent.

Further, the dynamic data analysis unit 150 of the system 100 can be configured to calculate, a first data exposure score associated with each of the set of competent agents corresponding to each categorized task. The first data exposure score is calculated based on the first trust value of each competent agent and the first risk value of each categorized task. The first trust value of each competent agent is calculated based on a plurality of trust attributes and the first risk value of each categorized task is calculated based on a plurality of risk attributes. The plurality of trust attributes includes the competency associated with each competent agent, a role associated with each competent agent and a trust factor associated with each competent agent. The role associated with each competent agent is associated with a weight. The risk value of each task is calculated based on a plurality of risk attributes. The plurality of risk attributes includes the weight associated with each attribute of said task, a number of attributes accessed per task, and a number of records accessed per task.

In an embodiment, each agent from the plurality of agents is associated with a role. The role represents functionality associated with a task or title in an organization and the role is utilized to authorize an agent for accessing a requested resource. For example, in a health care domain, a role of a physician is not performed by an accountant. Further, a role of an accountant may not be performed by a nurse. Furthermore, if the task is not assigned to an authorize agent, probability of data breach is high.

In an embodiment, the risk associated with each task identifies a violation associated with a plurality of entities and the plurality of attributes involved in the task based on certain predefined conditions. In an embodiment, the risk associated with a category of the task to be performed by an agent is based on the type of attribute accessed. For example, the task needs to access one or more SI attributes of the user for verification or other purpose. Further, the task can include access to a set of SI attributes of the user including bankcard numbers, Date of Birth (DoB) and email addresses. A privacy breach to the set of SI attributes of the user leads the user extremely vulnerable. Hence to restrict the agents from accessing the sensitive attributes, a privacy budget is assigned to each agent.

The risk value associated with the plurality of task for each of the competent agent is calculated based on equation 1.

$$Risk_i = (C_i) * N_j \in Agent, I \in task \quad (1)$$

Where, $C_i$ is the weight associated with each attributes 11,12,13 associated with the task 'i' by the agent 'j' and $N_i$ is the number of tuples accessed for the task 'i' by the agent 'j'. The cost $C_i$ associated with each attributes 11,12,13 is computed as follows: In an embodiment, the risk value associated with UI is computed as follows: For example, at least one UI of the user, can cause an agent to identify the user. An access to one UI can cause risk value as one. Here, a sign function is used to calculate the risk as given in equation 2.

$$Score(PI) = Sign(n) \quad (2)$$

In an embodiment, the confidence of identifying the user increases with the number of QI. The formula for calculating the risk associated with QI attributes is given in equation 3.

$$Score(QI) = 1 - e^{-n/k} \quad (3)$$

Where, n is the number of QI in the query and k is the maximum possible number of QI in the query In an embodiment, if an agent accesses higher number of SI, then there is higher chance of risk. The risk value associated with SI is as shown in 4.

$$Score(SI) = e^n \quad (4)$$

The total cost $C_i$ associated with each attributes 11,12,13 is given in equation 5.

$$C_i = max(score(PI), score(QI)) * score(SI) \quad (5)$$

In an embodiment, the trust value associated with each of the competent agents is calculated based on equation 6.

$$TrustValue_j = W_{j\_role} * competency_{level_{ij}} * tf_j, j \in Agent, i \in task \quad (6)$$

Where $W_{j\_role}$ is a weight associated to a role of the agent 'j', $competency\_level_{ij}$ is a competency associated with the agent 'j' for executing the task 'i' from the set of tasks and $tf_j$ is the trust factor associated with the agent 'j' from the set of competent agents. The trust factor of each competent agent is calculated based on the competency of each competent agent and a previous trust value of each competent agent.

Further, the first data exposure score associated with each competent agent for a particular task is calculated based on equation 7.

$$Data\ exposure\ score(e)_{ij} = TrustValue_j * Risk_i, j \in Agent, i \in task \quad (7)$$

Further, the dynamic data analysis unit 150 of the system 100 can be configured to simultaneously identify the conflict value associated with the set of categorized tasks and the set of competent agents based on a predefined task conflict matrix. The predefined task conflict matrix includes one or more combinations of the categorized tasks and a privacy breach associated with each competent agent while executing each combination of the categorized task. For example, a set of sub tasks executed together by the competent agent can lead to a breach to data privacy. For example, a set of employee attributes associated with an employee including name, Date of Birth (DoB), gender, zip code, position, salary, e-mail and telephone number. In an embodiment, salary, position and DoB are considered private details and not allowed to access with the name of the employee. Therefore, the sets of two task access {name, salary}, {name, position}, {name, DoB}, {Position, Salary} and {Salary, DoB} are identified as conflicting sub tasks.

In an embodiment, the set of attributes {DoB, gender, zip-code} can identify the employee in conjunction with other publicly available data. Hence the sub set {DoB, Gender, zip code} is identified as conflicting sub task.

Further, the dynamic data analysis unit 150 of the system 100 can be configured to allocate, each categorized task with the competent agent from the set of competent agents based on the plurality of allocation parameters. The plurality of allocation parameters includes an operational cost associated with each competent agent, a predetermined privacy budget associated with each competent agent, the first data exposure score associated with the competent agent and the conflict value. The operational cost associated with each competent agent is calculated based on the cost associated with each competent agent, a complexity associated with each categorized task and the risk value associated with each categorized task. The operational cost associated with each competent agent is calculated as given in equation 8.

$$Operational\ Cost(\alpha_{ji}) = f(Q_i, T_{ij}, Risk_i), j \in Agent, i \in task \quad (8)$$

Where, $Q_i$ is the cost associated with each competent agents, $T_{ij}$ is complexity of the task in terms of time, effort and accuracy and $Risk_i$ is the risk associated with the task 'i'.

Further, the dynamic data analysis unit 150 of the system 100 can be configured to calculate the second data exposure score associated with each of the allocated agent based on a second trust value associated with the agent and a second risk value of the task allocated to the agent. Here, the second risk value is computed based on equation 1, the trust risk value is computed based on equation 6 and the second data exposure score is calculated based on equation 7.

Figure 5:
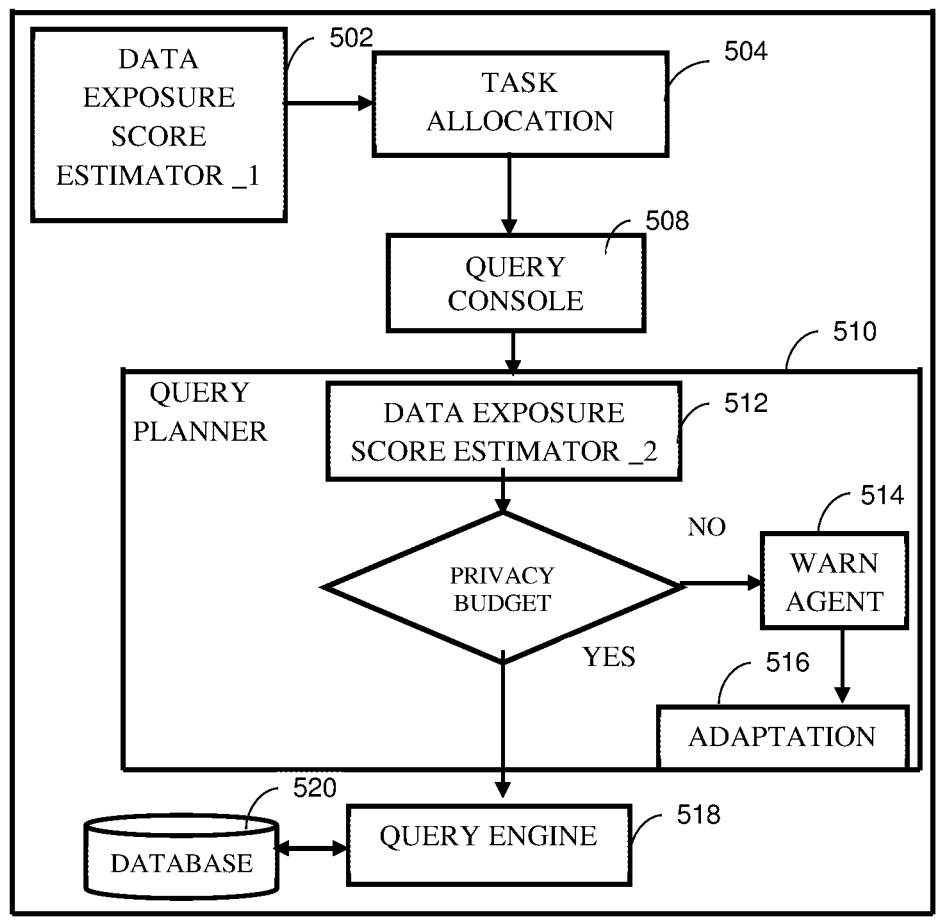
FIG. 5 is an exemplary flow diagram for identifying an anomalous agent, according to some embodiments of the present disclosure.

Further, the dynamic data analysis unit 150 of the system 100 can be configured to identify the anomalous agent from the set of competent agents, based on the comparison between the first data exposure score associated with each competent agent and the second exposure score associated with each competent agent. FIG. 5 is an exemplary flow diagram for identifying an anomalous agent, according to some embodiments of the present disclosure. Now referring to FIG. 6, a data exposure score estimator_1 502 calculates the first data exposure score and the task allocation is performed by the task allocation module 504 based on the plurality of allocation parameters including the operational cost associated with each allocated agent, the predetermined privacy budget associated with each allocated agent, the first data exposure score associated with the allocated agent and the conflict value. Further, a query console 508 executes the task and the second data exposure score is calculated by a data exposure score estimator_2 512 of a query planner 510. Further, the query planner 510 checks for any violation of data privacy by the allocated agent by comparing the first data exposure score and the second exposure score. If there is a variation between the first data exposure score and the second data exposure score, an alert is created. For example, if the violation of data exposure is unintentional, a warning is sent to the allocated agent. If the violation is intentional and occurred multiple times, the allocated agent is suspended and if the allocated agent has exceeded the privacy budget, the allocated agent is blocked. Simultaneously, the alert is sent to the administrator by the query planner 510 to the allocated agent. Further, the variation between the first data exposure score and the second data exposure score is updated by the adaptation module 516 (further explained in FIG. 6). Further, the allocated agent is checked for privacy budget and if the privacy budget is available, query engine 518 executes the task by fetching the attributes from the database 520.

Figure 6:
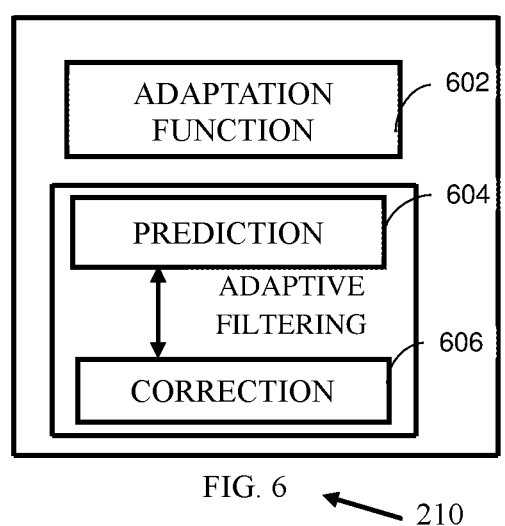
FIG. 6 illustrates an exemplary architecture of an adaptation module of FIG. 2, according to some embodiments of the present disclosure.

Further, the dynamic data analysis unit 150 of the system 100 can be configured to update, the privacy budget associated with each allocated agent by decrementing the second data exposure score from the predetermined privacy budget value associated with each allocated agent. Here, the predetermined privacy budget value is calculated based on the previous trust value associated with each allocated agent. FIG. 6 illustrates an exemplary architecture of the adaptation module of FIG. 2, according to some embodiments of the present disclosure. Now referring to FIG. 6, the adaptation module includes an adaptation function 602, a prediction function 604 and a correction function 606. The prediction function 604 and the correction function 606 is for adaptive filtering. The adaptation function 602 is unique for each module shown in FIG. 2 and the adaptation function 602 updates the plurality of parameters associated with each of the modules based on previous decisions. The predictive function 604 predicts the future value of allocation parameters. The correction function 606 performs correction in the allocation parameters and provide the corrected value as input to the corresponding modules. In an embodiment, knowledge regarding every periodic allocation is further applied to predict the future allocation. The adaptation module learns different properties at each instance and improves the performance of future allocation. Most of the modules are connected to the adaptation module to get feedback about previous allocations.

In an embodiment, the privacy budget associated with each allocated task is calculated as given in equation 9.

$$\text{PrivacyBudget}(B_t)_j = \text{PrivacyBudget}(B_{t-1})_j - \text{DES}(e)_{ij}, j \in \text{Agent}, i \in \text{task} \quad (9)$$

Where, PrivacyBudget $(B_t)_j$ is the new privacy budget associated with each allocated agent corresponding to the plurality of allocated tasks and the PrivacyBudget$(B_{t-1})_j$ is the present privacy budget of the allocated agent and DES $(e)_{ij}$ is the second data exposure score associated with the allocated agent for the allocated task.

FIG. 7 is an exemplary flow diagram for a processor implemented method for privacy enabled task allocation and data exposure monitoring, according to some embodiments of the present disclosure. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communication network. The order in which the method 700 is described is not intended to be construed as a limitation, and any number of the described method blocks can be combined in any order to implement the method 700, or an alternative method. Furthermore, the method 700 can be implemented in any suitable hardware, software, firmware, or combination thereof.

Figure 7A:
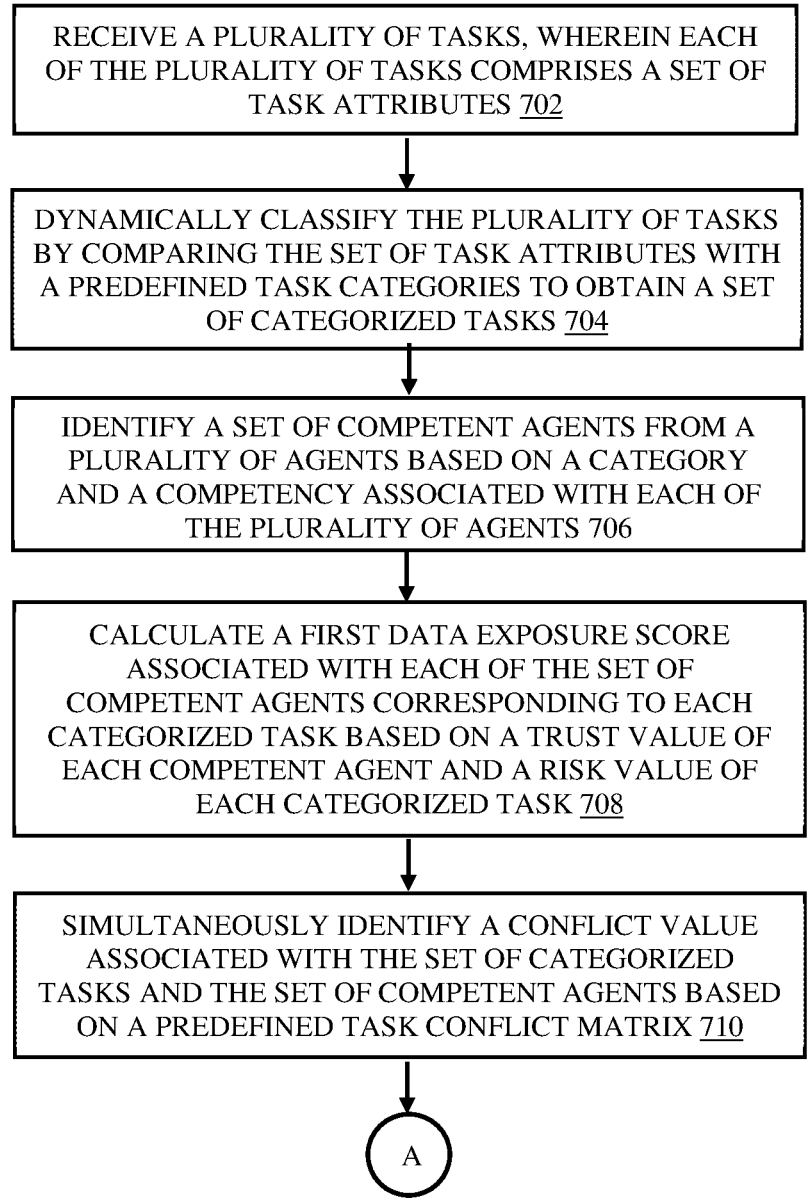
FIGS. 7A and 7B are an exemplary flow diagram for a processor implemented method for privacy enabled task allocation, according to some embodiments of the present disclosure.
Figure 7B:
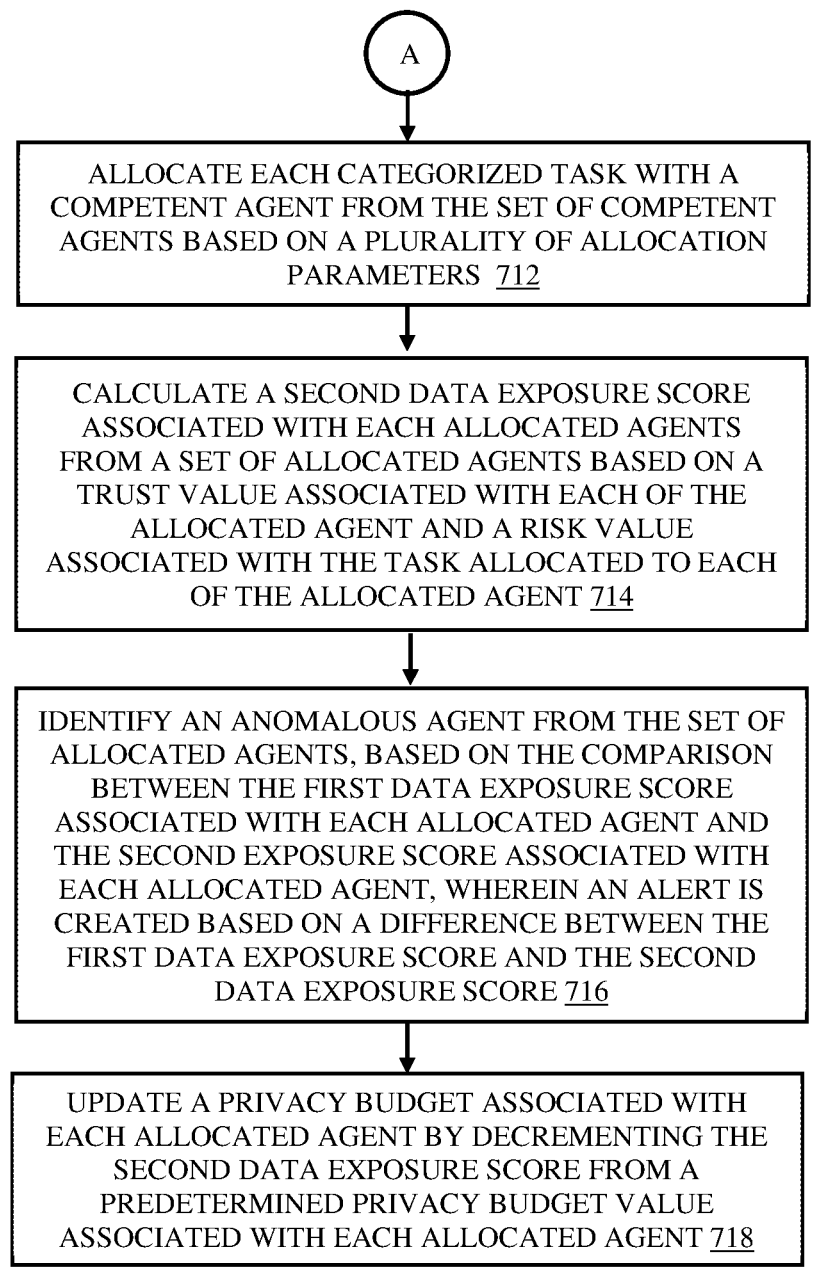

FIGS. 7A and 7B are the exemplary flow diagrams for a processor implemented method for privacy enabled task allocation, according to some embodiments of the present disclosure. At 702, the system 100 receives, by a one or more hardware processors, the plurality of tasks, wherein each of the plurality of tasks includes the set of task attributes. Each task attribute from the set of task attributes being at least one of a plurality of attribute categories. The plurality of attribute categories includes the unique identifier, the quasi-identifier and the sensitive identifier. Each attribute from the set of task attributes is associated with an attribute weight based on the plurality of attribute categories. At 704, the system 100 dynamically classifies, by the one or more hardware processors, the plurality of tasks by comparing the set of task attributes with the predefined task categories to obtain the set of categorized tasks. The plurality of task categories includes an access request, an action request, a select request, a parameter request, an aggregate request associated with a database. At 706, the system 100 identifies for each task, by the one or more hardware processors, the set of competent agents from the plurality of agents based on the category and the competency associated with each of the plurality of agents. Here, the competency associated with each agent from the set of competent agents includes the first level of expertise, the second level of expertise and the third level of expertise At 708, the system 100 calculates by the one or more hardware processors, the first data exposure score associated with each of the set of competent agents corresponding to each categorized task based on the first trust value of each competent agent and the first risk value of each categorized task. The first trust value of each competent agent is calculated based on the plurality of trust attributes and the first risk value of each categorized task is calculated based on the plurality of risk attributes. The plurality of trust attributes includes the competency associated with each competent agent, the role associated with each competent agent and the trust factor associated with each competent agent. The role associated with competent agent is associated with the role weight. The risk value of each task is calculated based on a plurality of risk attributes. The plurality of risk attributes includes the attribute weight of each attribute of the task, the number of attributes accessed per task, and the number of records accessed per task. At 710, the system 100 simultaneously identifies by the one or more hardware processors, the conflict value associated with the set of categorized tasks and the set of competent agents based on a predefined task conflict matrix. The predefined task conflict matrix includes one or more combinations of the categorized tasks and a privacy breach associated with each competent agent while executing each combination of the categorized task. At 712, the system 100 allocates by the one or more hardware processors, each categorized task with the competent agent from the set of competent agents based on the plurality of allocation parameters. The plurality of allocation parameters includes the operational cost associated with each competent agent, the predetermined privacy budget associated with each competent agent, the first data exposure score associated with the competent agent and the conflict value. The operational cost associated with each competent agent is calculated based on the cost associated with each competent agent, the complexity associated with each categorized task and the risk value associated with each categorized task In an embodiment, At 714, the system 100 further calculates by the one or more hardware processors, the second data exposure score associated with each allocated agents from the set of competent agents based on the second trust value associated with each of the allocated agent and the second risk value associated with the task allocated to each allocated agent. At 716, the system 100 further identifies by the one or more hardware processors, the anomalous agent from the set of allocated agents, based on the comparison between the first data exposure score associated with each allocated agent and the second exposure score associated with each allocated agent. An alert is created based on a difference between the first data exposure score and the second data exposure score. At 718, the system 100 further updates by the one or more hardware processors, the privacy budget associated with each allocated agent by decrementing the second data exposure score from a predetermined privacy budget value associated with each allocated agent. The predetermined privacy budget value is calculated based on the previous trust value associated with each allocated agent Experimentation In an embodiment, consider a banking system with user information including personal data, account details, bank email tracking data, transaction details and internal organization details of the user stored in tables. The bank includes a service desk to address queries of the user and bank employee. The service desk includes the set of roles at different level to access specific data. Each type of task is categorized for specific agent, having relevant competency. Trustworthiness for each agent is updated based on previous user feedback and quality of solution provided. Each agent allocated with the privacy budget based on role and trust factor history. The privacy budget is decreased based on the attributes the agent is accessing for the task. Every query executed by the agent to complete task is evaluated to calculate the risk score. This Risk score is subtracted from the agent profile for doing that task. Here, a set of roles of agents A1, A2, A3 and weights (W) are assigned by the administrator:—

Manager A1 where weight $W_{A1}$ is 1, wherein the weight is high as per role.
Accountant A2 where weight $W_{A2}$ is 0.66
Public officer A3 where weight $W_{A3}$ is 0.33, wherein the weight is low as per role.
Competency level for E3=90, for E2=60 and for E1=30
Table 1 provides risk associated with each task corresponding to the set of attributes accessed by the task.

TABLE 1

| Type of task | Attributes | Risk Value |
| --- | --- | --- |
| TC1 - Customer want to check balance | Account_id(UI), Name(UI), MobileNumber(UI), Balance(SI) | 2.71 |
| TC2 - Transaction failure | Account id(UI), Name(UI), Mobile number(UI), Time of transaction(SI), Transaction id(SI) | 7.389 |
| TC3- Change address | Account id(UI), Name(UI), Mobile number(UI), Past address(QI), Current address(QI) | 1 |
| TC4-Deactivate account | Account id(UI), Name(UI), DOB(PI), Last transaction(SI), Mobile number(UI), Branch(QI), Manger id(PI) | 1 |
| TC5 - Employee Salary | Employee ID (UI), Salary (QI), Name(UI) | 2.71 |
| TC6 - Credit card not received | Credit card last four digit(SI), Courier status | 2.71 |

As depicted in the table 1, TC1, TC2 . . . TC6 indicates task types and the corresponding attributes are given in the attributes column and the corresponding risk values are given in the risk value column. The risk value associated with the task increases based on the type of attribute associated with the task. The task T2 includes more SI and hence the risk value is more for task T2. Further, T1. T5 and T6 includes minimum number of SI but more UI and QI. Hence the risk value associated with T1, T5 and T6 is less than the T2. For example, the risk value of the task TC1 based on the values associated with the table 1 is, Risk Value=(max(sign(3), $(1-e^{1/7}))*e^{1}=2.71$.

In an embodiment, table 2 depicts the competency of each type of task and each agent. Here, TC1, TC2 . . . . TC6 indicates task category, A1. A2, A3 indicates agents and E, E2 and E3 indicates expert level of each agent for the corresponding task. Here, E1 indicates beginner level of expertise, E2 indicates intermediate level of expertise and E3 indicates expert level of expertise.

TABLE 2

| Competency | A1 | A2 | A3 |
| --- | --- | --- | --- |
| TC1 | E3 | E2 | E1 |
| TC2 | E3 | E2 | E1 |
| TC3 | E2 | E3 | E2 |
| TC4 | E2 | E3 | E1 |
| TC5 | E3 | E1 | E1 |
| TC6 | E2 | E1 | E3 |

TABLE 3

| Trust value | A1 | A2 | A3 |
| --- | --- | --- | --- |
| TC1 | 90 | 60.4 | 9.9 |
| TC2 | 90 | 60.4 | 9.9 |
| TC3 | 60 | 80.2 | 19.8 |
| TC4 | 60 | 80.2 | 9.9 |

TABLE 3-continued

| Trust value | A1 | A2 | A3 |
|---|---|---|---|
| TC5 | 90 | 40.6 | 9.9 |
| TC6 | 60 | 40.6 | 29.7 |

Table 3 depicts the first trust value associated with each agent for each task category. For example, the trust value for the agent A1 for executing the task TC1 is calculated as, Trust value=1*90*1=90. Table 4 depicts the first data exposure score associated with each allocated agent for the corresponding task category. For example, the trust value for the agent A1 for executing the task TC1 is calculated as $e_{ij}$=2.71*90=243.9, Table 5 depicts the operational cost associated with each allocated agent for the corresponding task category.

TABLE 4

| Data Exposure Score $e_{ij}$ | A1 | A2 | A3 |
|---|---|---|---|
| TC1 | 243.9 | 163.7 | 26.8 |
| TC2 | 665 | 446.3 | 73.2 |
| TC3 | 60 | 80.2 | 19.8 |
| TC4 | 60 | 80.2 | 9.9 |
| TC5 | 243.9 | 110 | 26.8 |
| TC6 | 162.6 | 110 | 80.5 |

TABLE 5

| Operational Cost | A1 | A2 | A3 |
|---|---|---|---|
| TC1 | 400 | 605 | 308 |
| TC2 | 356 | 989 | 635 |
| TC3 | 469 | 511 | 429 |
| TC4 | 910 | 589 | 912 |
| TC5 | 568 | 801 | 490 |
| TC6 | 969 | 209 | 333 |

TABLE 6

| Task | User | Request | Task Type | Allocation with data exposure risk | Operational Cost ($) |
|---|---|---|---|---|---|
| T1 | A | Deactivate account | TC4 | A2 | 589 |
| T2 | B | Transaction failure | TC2 | A1 | 356 |
| T3 | C | Deactivate account | TC4 | A2 | 589 |
| T4 | A | Credit card not received | TC6 | A2 | 209 |
| T5 | D | Employee Salary | TC5 | A3 | 490 |
| T6 | E | Change address | TC3 | A2 | 511 |
| T7 | B | Check balance | TC1 | A3 | 308 |
| T8 | E | Transaction failure | TC2 | A1 | 356 |

Table 6 depicts an allocation of tasks to agents by considering only the operational cost and without considering data exposure risk. Here, T1 and T4 are from same user A and an allocation of T1 and T4 to the same agent A2 may cause the agent A2 to get more sensitive information about the user A. Hence T1 and T4 are conflicting tasks. Similarly, T6 and T8 are conflicting tasks. Table 7 depicts a privacy budget utilization and violation for the agents A1, A2 and A3 after the task allocation as depicted in table 6. In table 7, it is shown that there is budget violation of 380 units by agent A1 and agent A2 is allocated four tasks.

TABLE 7

| Agent | First data exposure score | Privacy Budget | Budget violation | Capacity ($\gamma_j$) | Allocated |
|---|---|---|---|---|---|
| A1 | 1330.01 | 950 | 380 | 2 | 2 |
| A2 | 350 | 650 | 0 | 3 | 4 |
| A3 | 53.6 | 150 | 0 | 3 | 2 |

TABLE 8

| Task | User | Request | Task Category | Allocation without data exposure risk | Operational Cost ($) |
|---|---|---|---|---|---|
| T1 | A | Deactivate account | TC4 | A2 | 589 |
| T2 | B | Transaction failure | TC2 | A1 | 356 |
| T3 | C | Deactivate account | TC4 | A2 | 589 |
| T4 | A | Credit card not received | TC6 | A3 | 333 |
| T5 | D | Employee Salary | TC5 | A3 | 490 |
| T6 | E | Change address | TC3 | A3 | 429 |
| T7 | B | Check balance | TC1 | A1 | 400 |
| T8 | E | Transaction failure | TC2 | A2 | 989 |

Table 8 depicts the task allocation by considering minimum operational cost and without data exposure risk. Table 9 depicts an utilization of privacy budget and violation after the above allocation as depicted in table 8. In table 9, it is shown that there is no budget and capacity violation by any agent.

TABLE 9

| Agent | First data exposure score | Privacy Budget | Budget violation | Capacity ($\gamma_j$) | Allocated |
|---|---|---|---|---|---|
| A1 | 908.1 | 950 | 0 | 2 | 2 |
| A2 | 606.69 | 650 | 0 | 3 | 3 |
| A3 | 127.116 | 150 | 0 | 3 | 3 |

In an embodiment, as the number of tasks increases, allocating an agent to each task becomes a challenging problem. An example of allocating large numbers of tasks to the plurality of cost effective agents with minimal operational cost and satisfying privacy budget, capacity constraints, and conflict value is explained below:

Let A indicates the set of agents, T indicates the plurality of tasks, $b_a$ indicates the privacy budget of agent 'a', $\gamma_a$ indicates the capacity of the agent 'a', $e_{at}$ indicates the data exposure needed by agent 'a' for task 't', $\alpha_{at}$ indicates the operation cost for task T if done by agent 'a', $CG_i$ indicates the set 'i' of tasks, which are conflicting, 'a' is the index for agents, 't' index for tasks and 'i' is the index for clique. The objective is to allocate task to agents with minimal operational cost and minimal data exposure. The objective function for scenario 1 is given in equation 10.

$$\text{Min}(\Sigma_{a \in A} \Sigma_{t \in T} x_{at} \cdot \alpha_{at}) \quad (10)$$

A plurality of constraints associated with the objective function of scenario 1 are given below from equation 11 to 12.

$$\Sigma_{t \in T} x_{at} \cdot e_{at} \leq b_a, \forall a \in A \quad (11)$$

$$\Sigma_{a \in A} x_{at} \geq 1 \forall t \in T \quad (12)$$

$$\Sigma_{t\in T} x_{at} \leq \gamma_a, \forall a \in A \tag{13}$$

$$\Sigma_{t\in CG_i} x_{at} \leq 1, \forall a \in A \forall CG_i \in CG \tag{14}$$

$$x \in \{0,1\} \forall a,t \tag{15}$$

The constraints are (i) Sum of the data exposure score ($e_{at}$) of the assigned tasks to the agent must not exceed the privacy budget ($b_a$) of each agent, as given in equation 11, (ii) Agents should not be allocated to tasks which are in conflicts set ($CG_i$) as given in equation 14 (iii) Each agent should not be assigned maximum specific amount of task as given in equation 12, (iv) Each task should be assigned to at least one agent as given in equation 13. The solution has $x_{at}$ values in form of 0 and 1. The values which has values 1 represent that agent a is allocated task t, for example is $x_{12}$ is 1 means agent 1 is allocated $2^{nd}$ task and if $x_{14}$ is 0 means agent 1 is not allocated task 4.

In an embodiment, the task allocation problem with budget and conflict constraint is a NP hard problem, wherein the time complexity increases with the number of inputs. The present disclosure include two approaches to reduce the time complexity.

Approach 1: Procedure to perform efficient allocation of tasks to agents without violating privacy budget and capacity constraints, along with avoidance of data breach by allocating conflicting tasks to different agents. Here, the main objective is to perform allocation with minimal operational cost.

In an embodiment, a first approach to allocate task is given in example code below:

```
1:   Input: Operational Cost [agent, task], privacy budget[agent], Task
Capacity[agent], Data exposure Score [task], Conflict Value[task]
2:   Output: Task assignment
3:   for set of tasks which are in conflict list do
4:      solve assignment problem (AAP) (linear program) for these task
and take capacity of agent equal to one
5:      update task capacity and privacy budget
6:      While any agent violates privacy budget do
7:         Make the agent unavailable for future process
8:         reset the current assignment
9:         solve the assignment (AAP)again
10:     end
11:  end
12:  While any task is unassigned do
13:     solve assignment problem (linear program) for remaining task
14:     update task capacity and privacy budget
15:     for agent in agents do
16:        if violate privacy budget then
17:           solve knapsackMethod (KPM)
18:           set task to unassigned to tasks out of sack
19:           set task capacity equal to 0
20:        end
21:     end
22:  end
```

At step 1 all parameters including operational cost, privacy budget, agent capacity, data exposure and conflicting task are taken as input. From step 3 to 11, conflicting tasks are identified. From steps 12 to 22, unassigned tasks are assigned by solving an assignment problem using a linear programming optimization software or using least cost based approach and the privacy budget is updated.

In an embodiment, the knapsack method (KPM) for task allocation mentioned in the procedure of the first approach is given below:

```
1:   Input: agents violating privacy budget, task allocated to agent
2:   Output: assigned task
3:   Sort task in terms of e_ij/b_j in decreasing order
4:   load := 0;
5:   AssignedTask: = Ø;
6:   i := 1
7:   while load < b_j do:
8:      if eij ≤ b_j − load then
9:         AssignedTask = AssignedTask U i
10:        load = load + e_ij
11:        i = i + 1
10:  return AssignedTask
```

In an embodiment, the assignment (AAP) is explained below. Let A indicates the set of agents, T indicates the plurality of tasks, $\gamma_a$ indicates the capacity of the agent 'a', $\alpha_{at}$ indicates the operation cost for task 't' if done by agent 'a'. The objective is to allocate task to agents with minimal operational cost and minimal data exposure. The objective function for scenario 1 is given in equation 16 and the constraints are given in equation 17 to 19.

$$\text{Min}(\Sigma_{a\in A} \Sigma_{t\in T} x_{at} \cdot \alpha_{at}) \tag{16}$$

The constraints are $$\Sigma_{a\in A} x_{at} \geq 1 \forall t \in T \tag{17}$$

$$\Sigma_{t\in T} x_{at} \leq \gamma_a \forall a \in A \tag{18}$$

$$x \in \{0,1\} \forall a,t, \tag{19}$$

The task allocation based on the above procedure provides a quality solution compared to traditional round-robin approach and optimization solvers. The results are shown in table.

In an embodiment, an approach 2 to find a feasible solution to allocate tasks in quick time is given in example code below:

```
1:   Input: operational cost [agent, task], privacy budget [agent],
capacity[agent], first data exposure score[agent, task], list of
conflicting task
2:   Output: assignment
3:   Initialize nIter := 0 and x* := argmin{Δ(C^T x: Ax ≥ b)}
4:   If x* is an integer, return (x*)
5:   If x̃ := [x*](rounding of [x*])
6:   nIter := 0
7:   while Δ(x̃, [x*] > 0) and nIter > MaxIter do
8:      nIter+= 1
9:      x* := argmin{Δ(x̃,[x*]): Ãx ≥ b̃
10:     update = = x̃ := [x*]
11:  end
```

Where, x* is LP-Relaxed solution of the problem mention in mathematical model above.Δ is $L_1$ norm and Ãx≥~b is constraints matrix. Here, all the parameters including operational cost, privacy budget, agent capacity, data exposure and conflicting task are given as input. At step 6 the allocation problem is solved as a linear program problem. At step 7, If the solution for x*∈{0, 1} the solution is accepted and algorithm end, else move forward. At step 9, If the solution x* has fractional values then it's rounded to x̃ using below strategies. The method of rounding of is performed as follows: (i) For each task check any agent get assigned full task. If yes then make x̃ corresponding to this task and agent equal to one (ii) In remaining unassigned tasks check if any agent which get partially assigned, making that task fully assigned is feasible. If yes then make x̃ corresponding to this task and agent equal to one and (iii) In remaining unassigned tasks check if any agent can accommodate the task and solution is still feasible then make x̃ corresponding to this task and agent to equal to one. Further, the rounding off is iterated from step 7 to 11.

Figure 8A:
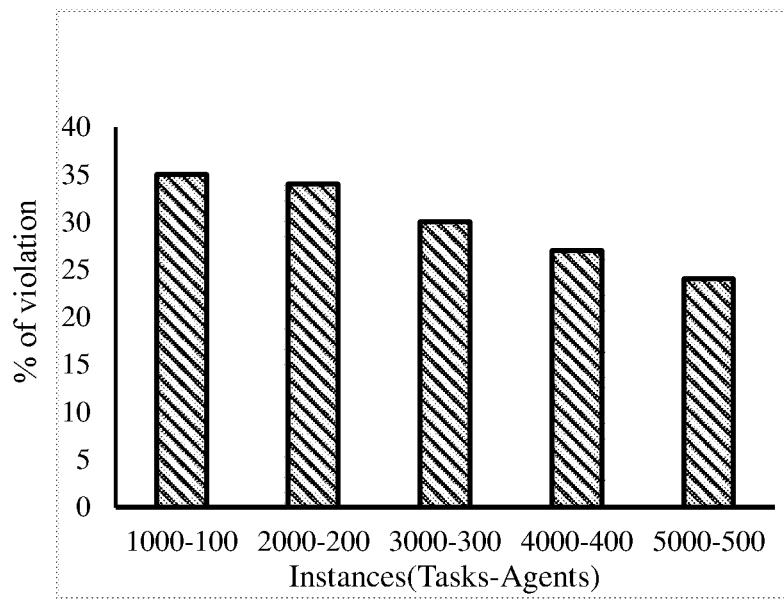
FIG. 8A illustrates an exemplary bar chart illustrating percentage of privacy budget breach of a plurality of agents, according to some embodiments of the present disclosure.

In an embodiment, FIG. 8A illustrates an exemplary bar chart illustrating privacy budget breach of a plurality of agents, according to some embodiments of the present disclosure. Now referring to FIG. 8A, the instance size (Task-Agent) is plotted in the X axis and the percentage of violation is plotted in the Y axis.

Figure 8B:
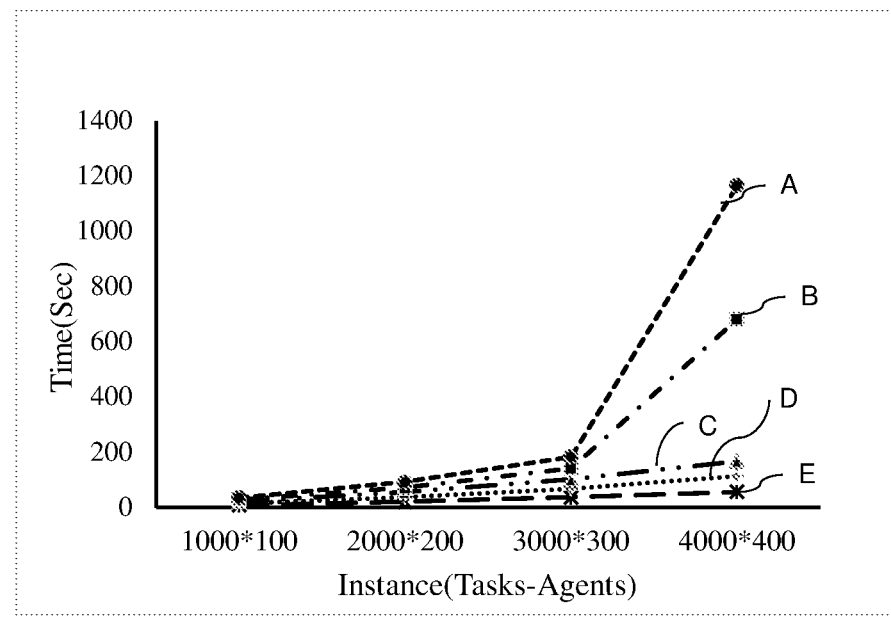
FIG. 8B illustrates an exemplary line chart illustrating a time required to solve integer programming model without considering privacy constraints, according to some embodiments of the present disclosure.

FIG. 8B illustrates an exemplary line chart illustrating a time required to solve integer programming model without considering privacy constraints, according to some embodiments of the present disclosure. Now referring to FIG. 8B, each line in the graph represent different 5 runs for each instance of problem. The instance size (Task-Agent) is plotted in the X axis and the time in seconds required to allocate the plurality of tasks is plotted in the Y axis. For example, the line A in FIG. 8B indicates the time required to allocate an instance of 10, the line B indicates the time required to allocate an instance of 7.5, the line C indicates the time required to allocate an instance of 5, the line D indicates the time required to allocate the instance of 2.5 and the line E indicates the time required to allocate the instance of 0.

Figure 8C:
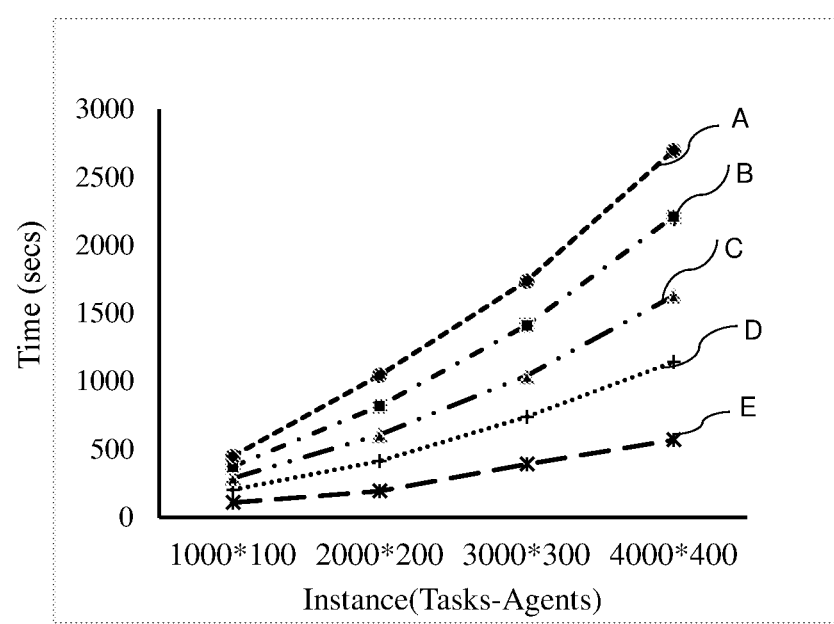
FIG. 8C illustrates an exemplary line chart illustrating a time required to solve integer programming model by considering privacy constraints, according to some embodiments of the present disclosure.

FIG. 8C illustrates an exemplary line chart illustrating a time required to solve integer programming model by considering privacy constraints, according to some embodiments of the present disclosure. Now referring to FIG. 8C, the instance size (Task-Agent) is plotted in the X axis and the time in seconds required to allocate the plurality of tasks is plotted in the Y axis. Each line in the graph represent different conflict value for each instance of problem For example, the line A in FIG. 8B indicates the conflict density associated with an allocation of an instance of 10, the line B indicates the conflict density associated with an allocation of an instance of 7.5, the line C indicates the conflict density associated with an allocation of an instance of 5, the line D indicates the conflict density associated with an allocation of an instance of 2.5 and the line E indicates the conflict density associated with an allocation of an instance of 0.

Figure 8D:
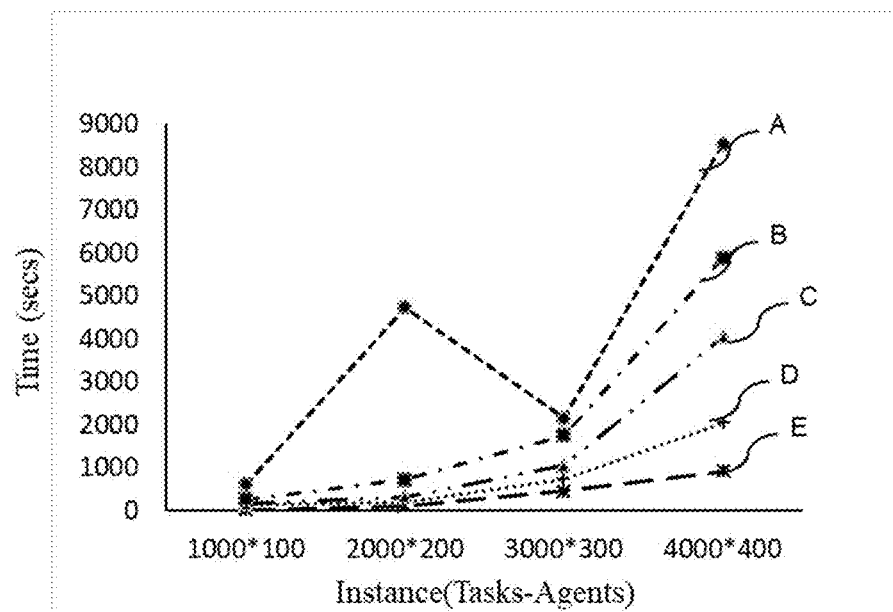
FIG. 8D illustrates an exemplary line chart illustrating a time required for task allocation by utilizing the method disclosed according to some embodiments of the present disclosure.

FIG. 8D illustrates an exemplary line chart illustrating a time required for task allocation by the present disclosure, according to some embodiments of the present disclosure. Now referring to FIG. 8D, the instance size (Task-Agent) is plotted in the X axis and the time in seconds required to allocate the plurality of tasks is plotted in the Y axis. Each line in the graph represent different conflict value for each instance of problem For example, the line A in FIG. 8B indicates the conflict density associated with an allocation of an instance of 10, the line B indicates the conflict density associated with an allocation of an instance of 7.5, the line C indicates the conflict density associated with an allocation of an instance of 5, the line D indicates the conflict density associated with an allocation of an instance of 2.5 and the line E indicates the conflict density associated with an allocation of an instance of 0.

Figure 8E:
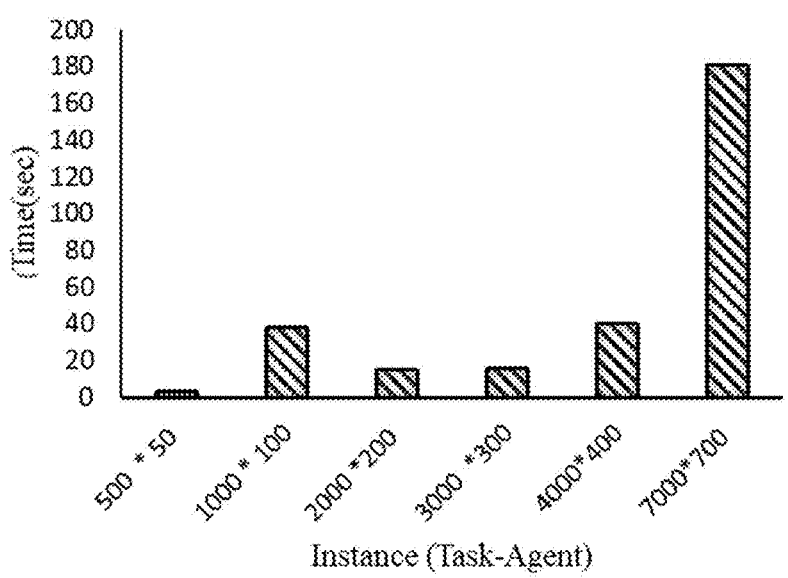
FIG. 8E illustrates an exemplary bar chart illustrating a mean time required to obtain a faster feasible solution by utilizing the method disclosed, according to some embodiments of the present disclosure.

FIG. 8E illustrates an exemplary bar chart illustrating a mean time required to obtain a faster feasible solution, according to some embodiments of the present disclosure. Now referring to FIG. 8E, the time in seconds required to obtain faster feasible solution by satisfying feasibility constraints is plotted in the Y axis. The instance size (Task-Agent) is plotted in the X axis.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of privacy enabled task allocation. The embodiment, thus provides a dynamic data analysis approach with data exposure score estimation and conflict value calculation approach to allocate task with privacy. Further, the privacy enable task allocation system and method monitors the plurality of agents for any privacy breach under various embodiments.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, the method comprising:
   receiving, by a one or more hardware processors, a plurality of tasks, wherein each of the plurality of tasks comprises a set of task attributes;
   dynamically classifying, by the hardware processor, the plurality of tasks by comparing the set of task attributes with a predefined task categories to obtain a set of categorized tasks;
   identifying, by the one or more hardware processors, for each categorized task, a set of competent agents from a plurality of agents based on a category and a competency associated with each of the plurality of agents;
   calculating, by the one or more hardware processors, a first data exposure score associated with each of the set of competent agents corresponding to each categorized task based on a first trust value of each of the set of competent agents and a first risk value of each categorized task, wherein the first trust value of each competent agent is calculated based on a plurality of trust attributes and the first risk value of each categorized task is calculated based on a plurality of risk attributes;
   simultaneously identifying, by the one or more hardware processors, a conflict value associated with the set of categorized tasks and the set of competent agents based on a predefined task conflict matrix, wherein the predefined task conflict matrix comprises one or more combinations of the categorized tasks, and a privacy breach associated with each competent agent while executing each combination of the categorized task; and
   allocating, by the one or more hardware processors, each categorized task with a competent agent from the set of competent agents based on a plurality of allocation parameters, wherein the plurality of allocation parameters comprising the first data exposure score, the conflict value, an operational cost associated with each competent agent and a predetermined privacy budget associated with each competent agent.

2. The processor implemented method of claim 1, further comprising:
   calculating, by the one or more hardware processors, a second data exposure score associated with each allocated agents from the set of competent agents based on a second trust value associated with each of the allocated agent and a second risk value associated with the task allocated to each allocated agent;
   identifying, by the one or more hardware processors, an anomalous agent from the set of competent agents, based on the comparison between the first data exposure score associated with each allocated agent and the second exposure score associated with each allocated agent, wherein an alert is created based on a difference between the first data exposure score and the second data exposure score; and
   updating, by the one or more hardware processors, a privacy budget associated with each allocated agent by decrementing the second data exposure score from a predetermined privacy budget value associated with each allocated agent, wherein the predetermined privacy budget value is calculated based on a previous trust value associated with each allocated agent.

3. The processor implemented method of claim 1, wherein each task attribute from the set of task attributes comprises a plurality of attribute categories, wherein the plurality of attribute categories comprises a unique identifier, a quasi-identifier and a sensitive identifier.

4. The processor implemented method of claim 1, wherein the operational cost associated with each competent agent is calculated based on the cost associated with each competent agent, a complexity associated with each categorized task and the risk value associated with each categorized task.

5. The processor implemented method of claim 1, wherein each attribute from the set of task attributes is associated with an attribute weight based on the plurality of attribute categories.

6. The processor implemented method of claim 1, wherein the plurality of task categories comprising an access request, an action request, a select request, a parameter request, an aggregate request associated with a database.

7. The processor implemented method of claim 1, wherein the competency associated with each agent from the set of competent agents comprises a first level of expertise, a second level of expertise and a third level of expertise.

8. The processor implemented method of claim 1, wherein the plurality of trust attributes comprising the competency associated with each competent agent, a role associated with each competent agent and a trust factor associated with each competent agent, wherein the role associated with competent agent is associated with a role weight.

9. The processor implemented method of claim 1, wherein the plurality of risk attributes comprises the attribute weight of each attribute of the task, a number of attributes accessed per task, and a number of records accessed per task.

10. The processor implemented method of claim 7, wherein, the trust factor associated with each competent agent is calculated based on the competency of each competent agent and a previous trust value of each competent agent.

11. A system comprising:
    at least one memory storing programmed instructions;
    one or more Input/Output (I/O) interfaces
    one or more hardware processors operatively coupled to the at least one memory, wherein the one or more hardware processors are configured by the programmed instructions to:
    receive, a plurality of tasks, wherein each of the plurality of tasks comprises a set of task attributes;

dynamically classify, the plurality of tasks by comparing the set of task attributes with a predefined task categories to obtain a set of categorized tasks;

identify, for each task, a set of competent agents from a plurality of agents based on a category and a competency associated with each of the plurality of agents;

calculate, a first data exposure score associated with each of the set of competent agents corresponding to each categorized task based on a first trust value of each competent agent and a first risk value of each categorized task, wherein the first trust value of each competent agent is calculated based on a plurality of trust attributes and the first risk value of each categorized task is calculated based on a plurality of risk attributes;

simultaneously identify, a conflict value associated with the set of categorized tasks and the set of competent agents based on a predefined task conflict matrix, wherein the predefined task conflict matrix comprises one or more combinations of the categorized tasks, and a privacy breach associated with each competent agent while executing each combination of the categorized task; and allocate, each categorized task with a competent agent from the set of competent agents based on a plurality of allocation parameters, wherein the plurality of allocation parameters comprising the first data exposure score associated with the competent agent, the conflict value, an operational cost associated with each competent agent and a predetermined privacy budget associated with each competent agent.

12. The system of claim 11, wherein the one or more hardware processors are configured by the programmed instructions to:

calculate, a second data exposure score associated with each allocated agents from the set of competent agents based on a second trust value associated with each of the allocated agent and a second risk value associated with the task allocated to each allocated agent;

identify, an anomalous agent from the set of competent agents, based on the comparison between the first data exposure score associated with each allocated agent and the second exposure score associated with each allocated agent, wherein an alert is created based on a difference between the first data exposure score and the second data exposure score; and update, a privacy budget associated with each allocated agent by decrementing the second data exposure score from a predetermined privacy budget value associated with each allocated agent, wherein the predetermined privacy budget value is calculated based on a previous trust value associated with each allocated agent.

13. The system of claim 11, wherein each task attribute from the set of task attributes comprises a plurality of attribute categories, wherein the plurality of attribute categories comprises a unique identifier, a quasi-identifier and a sensitive identifier.

14. The system of claim 11, wherein the operational cost associated with each competent agent is calculated based on the cost associated with each competent agent, a complexity associated with each categorized task and the risk value associated with each categorized task.

15. The system of claim 11, wherein each attribute from the set of task attributes is associated with an attribute weight based on the plurality of attribute categories.

16. The system of claim 11, wherein the plurality of task categories comprising an access request, an action request, a select request, a parameter request, an aggregate request associated with a database.

17. The system of claim 11, wherein the competency associated with each agent from the set of competent agents comprises a first level of expertise, a second level of expertise and a third level of expertise, and wherein, the trust factor associated with each competent agent is calculated based on the competency of each competent agent and a previous trust value of each competent agent.

18. The system of claim 11, wherein the plurality of trust attributes comprising the competency associated with each competent agent, a role associated with each competent agent and a trust factor associated with each competent agent, wherein the role associated with competent agent is associated with a role weight.

19. The system of claim 11, wherein the plurality of risk attributes comprises the attribute weight of each attribute of the task, a number of attributes accessed per task, and a number of records accessed per task.

20. One or more non-transitory machine readable information storage mediums comprising one or more instructions which when executed by one or more hardware processors causes:

receiving, by a one or more hardware processors, a plurality of tasks, wherein each of the plurality of tasks comprises a set of task attributes;

dynamically classifying, by the hardware processor, the plurality of tasks by comparing the set of task attributes with a predefined task categories to obtain a set of categorized tasks;

identifying, by the one or more hardware processors, for each categorized task, a set of competent agents from a plurality of agents based on a category and a competency associated with each of the plurality of agents;

calculating, by the one or more hardware processors, a first data exposure score associated with each of the set of competent agents corresponding to each categorized task based on a first trust value of each of the set of competent agents and a first risk value of each categorized task, wherein the first trust value of each competent agent is calculated based on a plurality of trust attributes and the first risk value of each categorized task is calculated based on a plurality of risk attributes;

simultaneously identifying, by the one or more hardware processors, a conflict value associated with the set of categorized tasks and the set of competent agents based on a predefined task conflict matrix, wherein the predefined task conflict matrix comprises one or more combinations of the categorized tasks, and a privacy breach associated with each competent agent while executing each combination of the categorized task; and allocating, by the one or more hardware processors, each categorized task with a competent agent from the set of competent agents based on a plurality of allocation parameters, wherein the plurality of allocation parameters comprising the first data exposure score, the conflict value, an operational cost associated with each competent agent and a predetermined privacy budget associated with each competent agent.

* * * * *